US005239560A

United States Patent [19]

Daniel

[11] Patent Number: 5,239,560
[45] Date of Patent: Aug. 24, 1993

[54] CONVEYING DIGITAL DATA IN NOISY, UNSTABLE, MULTIPATH ENVIRONMENTS

[75] Inventor: Richard A. Daniel, Kingston, Wash.

[73] Assignee: The United States of America as Represented by the Secretary of the Navy, Washington, D.C.

[21] Appl. No.: 720,129

[22] Filed: Jun. 24, 1991

[51] Int. Cl.⁵ .................... H04L 27/28; H04J 11/00
[52] U.S. Cl. ............................ 375/38; 370/21; 341/180
[58] Field of Search .............. 375/17, 34, 38, 39, 375/58; 371/37.4; 340/825.74; 341/179, 180; 370/19, 21; 455/40

[56] References Cited

U.S. PATENT DOCUMENTS

| 3,510,595 | 5/1970 | Gutleber | 370/19 |
|---|---|---|---|
| 3,518,547 | 6/1970 | Filipowsky | 370/21 |
| 3,810,019 | 5/1974 | Miller | 375/38 |
| 3,833,767 | 9/1974 | Wolf | 370/21 |
| 4,293,953 | 10/1981 | Gutleber | 370/21 |
| 4,601,046 | 7/1986 | Halpern et al. | 375/38 |
| 4,731,799 | 3/1988 | Longstaff et al. | 375/39 |

Primary Examiner—Curtis Kuntz
Assistant Examiner—Young Tse
Attorney, Agent, or Firm—William C. Townsend; Edward J. Connors; Kenneth W. Dobyns

[57] ABSTRACT

An decoding system for transmitting a signal through a noisy, unstable, multipath environment, in which the signal consisting of eight possible symbols is encoded using four of eight possible frequencies in an orthogonal Hadamard matrix, transmitted through the environment, and decoded using the same orthogonal Hadamard matrix, thereby providing a correlation result which can compensate for at least one error in the received signal for each symbol.

4 Claims, 5 Drawing Sheets

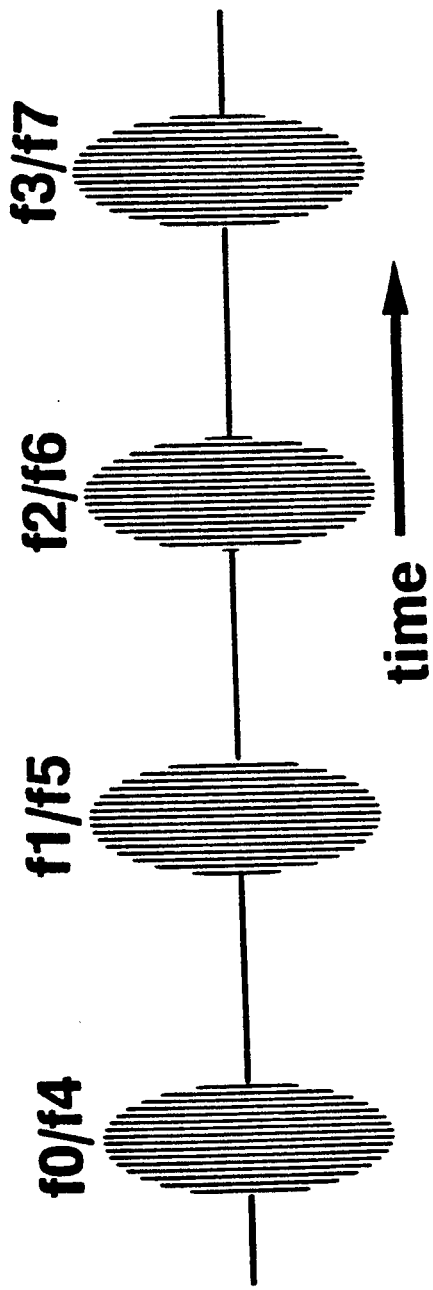
Fig. 3A Series Signal Format
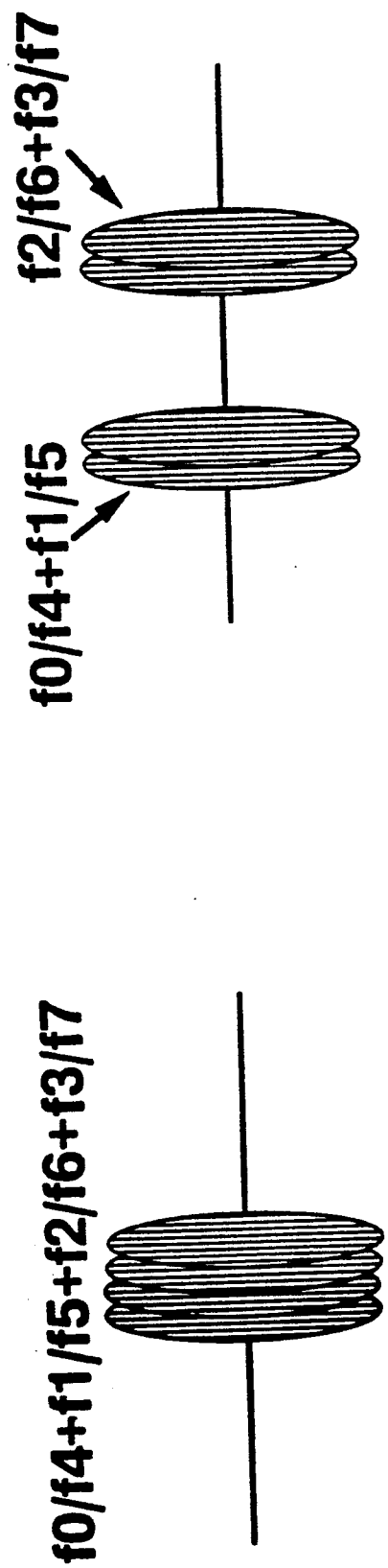
Fig. 3C Mixed Signal Format
Fig. 3B Parallel Signal Format

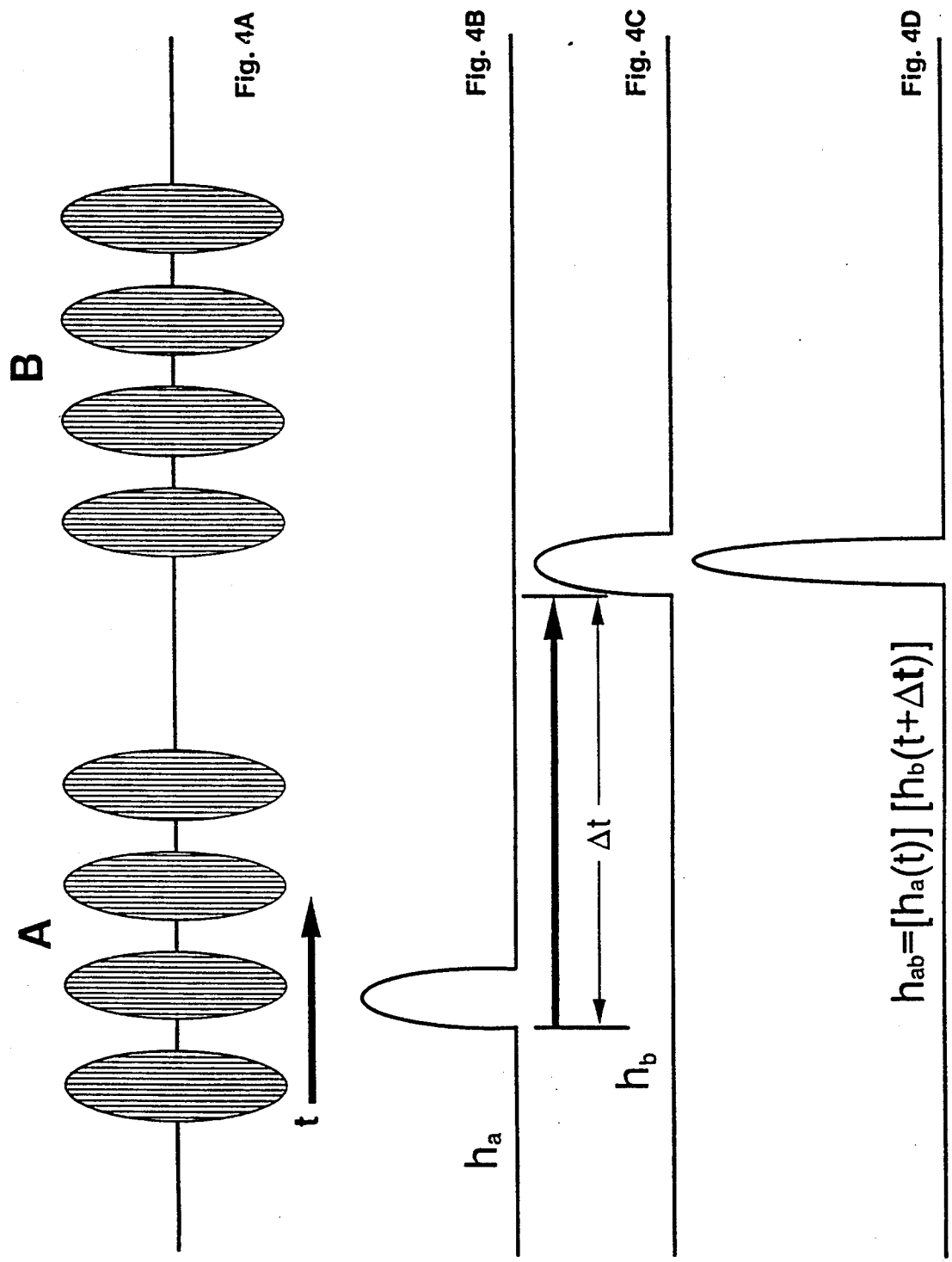

CONVEYING DIGITAL DATA IN NOISY, UNSTABLE, MULTIPATH ENVIRONMENTS

BACKGROUND OF THE INVENTION

1. FIELD OF THE INVENTION

The invention relates to a robust system to send digital data, such as tracking and telemetry information, through a contaminated environment, which may be noisy, unstable, and/or multipath, where multiple transmission paths, including fading paths, interfere with accurate message transmission. A further need is to minimize the message length while providing an increased ability to reject noise.

2. DESCRIPTION OF THE PRIOR ART

Several naturally occurring transmission media used as communications paths are subject to multiple transmission paths which fade in and out of existence at unpredictable intervals Among these are underwater paths and paths involving the ionosphere.

Numerous attempts have been made to achieve data transmission through contaminated environments, including quasi-random sequences of very short Phase Shift Keyed (PSK) signals, which are intended to get entirely through the transmission path before signals from longer alternate paths can begin to get through. Other signals called Spaced Frequency Shift Keyed (SFSK) are spaced apart in time sufficiently to allow the signals from the longer alternate paths to die out before the next short burst of signal is sent. These methods have one disadvantage that special effort must be made to match the signal length and interval to the available transmission paths, and another disadvantage that the waiting intervals involved with SFSK make transmission of a length message quite slow.

Chauncey S. Miller, in U.S. Pat. No. 3,810,019, used a multifrequency communication system in which each data symbol of the data symbol set being used was assigned to a subgroup of the available frequencies, in accordance with a Hadamard matrix. This was an interesting attempt to solve the problem, but his attempts to manipulate the Hadamard matrix, particularly in replacing the minus ones with zeroes, destroyed its natural orthogonality, thereby, at that point, removing it from the scope of the definition of a Hadamard matrix. The utility of the Miller system did not extend to cases where there was a frequency shift in the transmission path, such as occur with Doppler changes.

SUMMARY OF THE INVENTION

The invention has as its primary object to provide a method and means to send data symbols through a contaminated environment, which may or may not, from time to time, be noisy, and provide multiple transmission paths, some or all of which fade in and out, and some or all of which provide frequency shifts such as occur with Doppler changes. An available universe of possible frequencies (for example, eight frequencies) is provided, and each symbol to be sent as a signal is encoded by a predetermined smaller group of frequencies chosen from that universe (for example, four frequencies chosen from the eight). The smaller group of frequencies (e.g., four) is sent either in parallel, in series, or in a combination (as two serial groups of two signals in parallel). When received through the contaminated environment, the present and absent frequencies are treated as part of a Hadamard matrix. A predetermined number of symbols (eight in this example) can be reliably distinguished by the proper manipulation of the Hadamard matrix.

BRIEF DESCRIPTION OF THE DRAWINGS

FIGS. 3A, 3B, and 3C show respectively how the four frequencies mentioned above might be transmitted in series, in parallel, and as two serial groups of two signals transmitted in parallel.

FIG. 4A shows how two separate sequences of four signals might be sent in series, with individual correlation pulses for the separate sequences respectively shown in FIGS. 4B and 4C, and a combined correlation of the two sequences is shown in FIG. 4D.

DESCRIPTION OF THE PREFERRED EMBODIMENT

The first task in implementing this invention is to choose the number of possible frequencies in the universe to be used. Although other possibilities exist, there are restrictions placed upon the choice by the structure of the Hadamard matrix, and the optimum number of frequencies in the universe to be used seems to be eight. The use of that number is assumed in the following discussions but other numbers would be possible and within the scope of the invention. The eight frequencies are arranged as f0, f1, f2, f3, f4, f5, f6, and f7. These are arranged as four sets of two frequencies each, in this example f0/f4, f1/f5, f2/f6 and f3/f7. One frequency in each set (in this example, the first —f0, f1, f2, and f3—is given the logic value +1. In order to maintain orthogonality, each transmitted symbol may be represented by either exactly zero, two or four plus one values, the remainder being minus one values. The eight possible symbols are then represented by the four sets of frequencies as follows:

TABLE 1

| Symbol | f0/f4 | f1/f5 | f2/f6 | f3/f7 |
|---|---|---|---|---|
| 0 | +1 | +1 | +1 | +1 |
| 1 | +1 | −1 | −1 | +1 |
| 2 | +1 | −1 | +1 | −1 |
| 3 | +1 | +1 | −1 | −1 |
| 4 | −1 | −1 | −1 | −1 |
| 5 | −1 | +1 | +1 | −1 |
| 6 | −1 | +1 | −1 | +1 |
| 7 | −1 | −1 | +1 | +1 |

The available symbols in this system can be thought of as the numbers 0 through 7 in an octal or base-8 number system. When it is desired to transmit one of the symbols, the proper set of four frequencies to represent the symbol is chosen and transmitted. For example, to transmit the symbol 1, the frequencies f0, f5, f6, and f3 are transmitted to provide the values +1, −1, −1, and +1.

Figure 1:
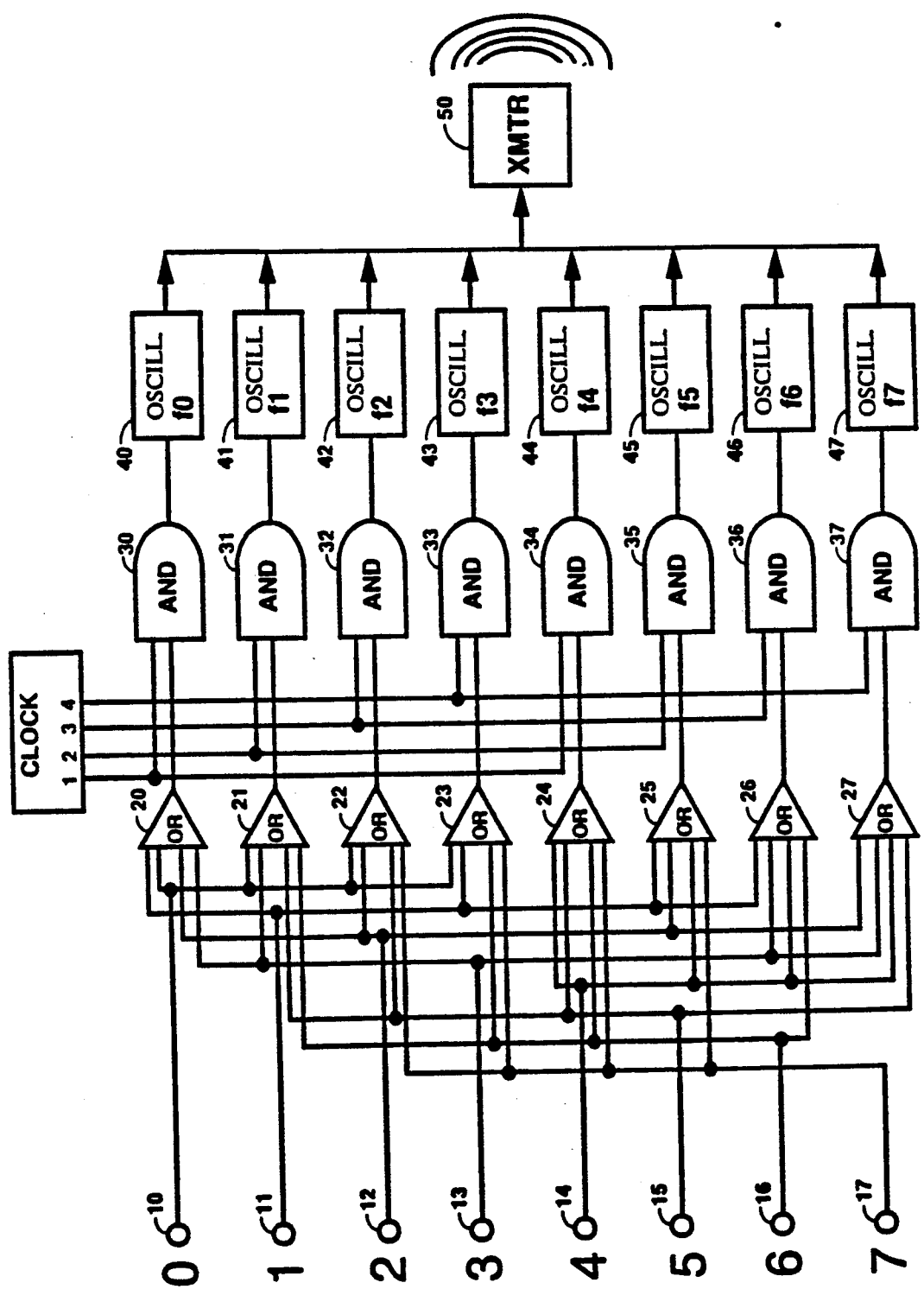
FIG. 1 is a diagram of an encoder and transmitter for encoding and transmitting signals in accordance with one embodiment of the invention.

Referring to FIG. 1, one of the eight available symbols 0 through 7 is presented as a symbol signal at a corresponding input terminal 10 through 17. Eight OR gates 20 through 27 are provided, each having four inputs. The eight OR gates respectively correspond to the eight possible output frequencies. The symbol signal on each of terminals 10 through 17 is provided to a predetermined four of the eight possible OR gates, each symbol signal being supplied to a different group of four OR gates. The four OR gates which correspond to each symbol signal are chosen in accordance with Table 1 above. There are thus four possible symbol signals input to each OR gate and capable of inducing an output from that OR gate when present. The outputs from OR gates 20 through 27 are respectively fed to one input each of AND gates 30 through 37. A clock 39 provides outputs to determine the order and duration of opening of AND gates 30 through 37. Assuming that the four frequencies to be transmitted to represent the code are to be transmitted in series, the outputs from the clock from its terminals 1, 2, 3, and 4 are pulsed in sequence in that order and possibly with a separation or delay between the outputs sufficient to allow all the echoes and reverberations in the transmission medium to die out before the clock cycle is completed. Each of the clock outputs is provided to two AND gates, to gate those AND gates open to allow passage of the signal from the respective OR gates. Each AND gate signal goes respectively to one of eight single frequency oscillators 40 through 47 to pulse that oscillator on for the duration of the clock signal at the input of that AND gate. The single frequency from oscillators 40 through 47 is respectively f0, f1, f2, f3, f4, f5, f6, and f7. All of the frequencies available from the AND gates are presented to the input of transmitter 50, to determine the frequency of the transmitted signal from that transmitter into the contaminated medium. The transmitted signal can be acoustic waves at audio frequencies for communication through the water, or it can be radio waves at higher frequencies for communication through the atmosphere and ionosphere.

Figure 2:
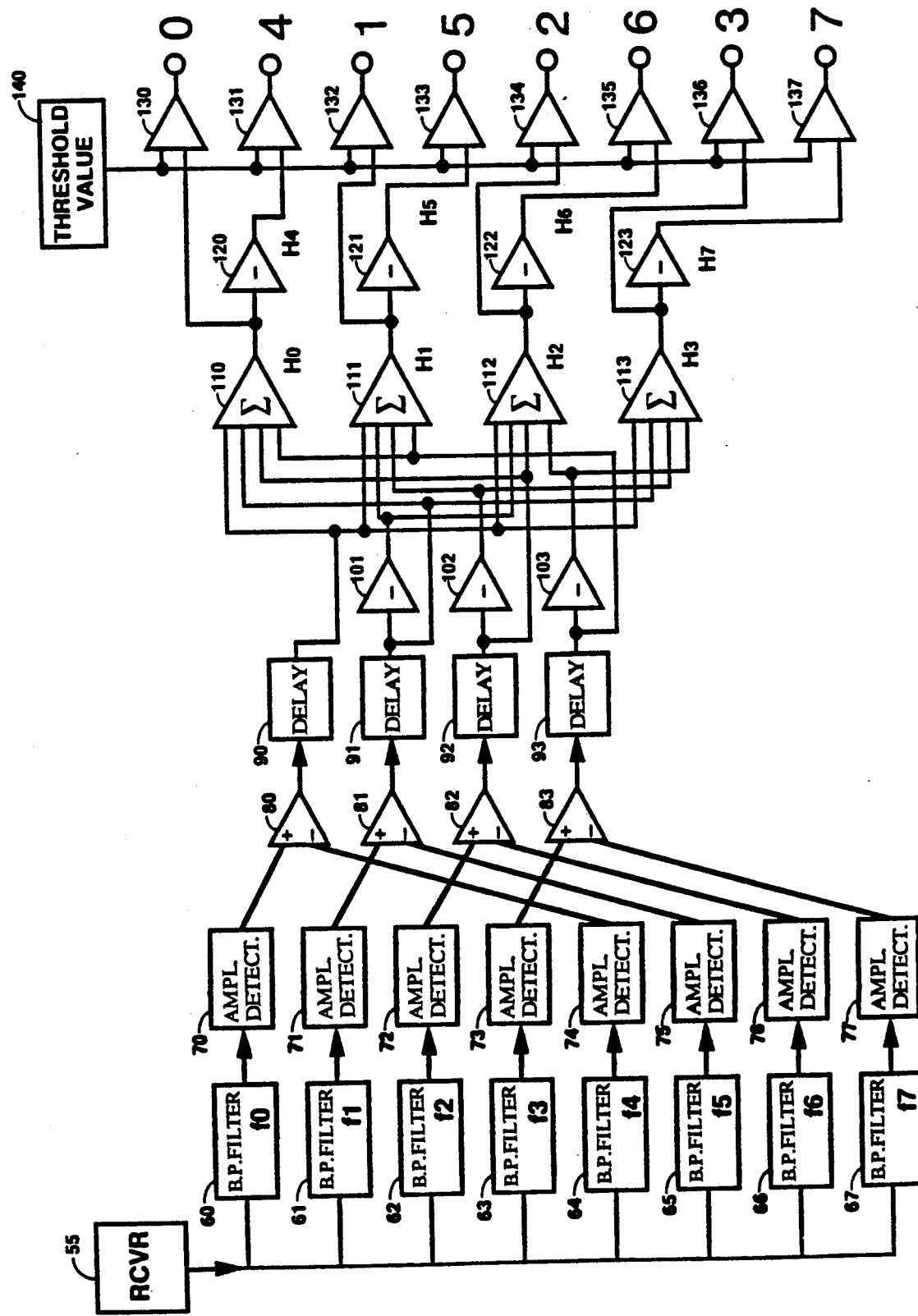
FIG. 2 is a diagram of a special-purpose signal processor for processing received signals in accordance with one embodiment of the invention.

Referring now to FIG. 2, the signal, after transmission through the communications medium, is received at receiver 55, which may be a radio receiver, an acoustic receiver, or whatever other type of receiver may correspond to the output of transmitter 50. The signal from the receiver is passed to bandpass filters 60 through 67, which are arranged respectively to pass signals f0 through f7 to amplitude detectors 70 through 77, the outputs of which are positive only when signals f0 through f7 are respectively being received. The signals representing the two frequencies f0/f4 of the first set are fed respectively to non-inverting and inverting inputs of differential amplifier 80, those from f1/f5 to amplifier 81, those from f2/f6 to amplifier 82, and those from f3/f7 to amplifier 83.

At the appropriate time for the reception of one of the signals f0/f4, one (and only one) of the two signals should ideally be received and pass the bandpass filters to be respectively detected by amplitude detector 70 or 74. If f0 is received, a unit positive signal will be received at the positive input terminal of differential amplifier 80, resulting in a +1 output from amplifier 80. On the other hand, if f4 is received, a unit positive signal will be received at the negative input terminal of amplifier 80, resulting in a −1 output from amplifier 80. Ideally, the two signals f0 and f4 would never be received at the same time, but if they were, they should cause a zero output from amplifier 80. There should also be a zero output from amplifier 80 at any time when neither signal f0/f4 is present. Similarly, f1/f5 respectively cause outputs +1/−1 from amplifier 81, as do f2/f6 from amplifier 82, and f3/f7 from amplifier 83. The outputs from differential amplifiers 80, 81, 82, and 83 are respectively fed through time delays 90, 91, 92, and 93. The delay imposed by these time delays depends upon the format used in the transmission of the signals. If all four signals are transmitted simultaneously, the four delays may be identical or non-existent. If the four signals are transmitted serially, the four delays are such as to cause the signals resulting from all four signals to pass through the time delays in coincidence. Next, the +1/−1 factors from each of the pairs of frequencies are multiplied by the sets of reference values in Table 1 for each possible symbol to obtain a correlation or recognition value for each symbol. This may be done in accordance with matrix equation 1, below. Ideally, these Recognition values can only be −4, 0, or +4. As will be shown later, in a contaminated or imperfect transmission system, other recognition values can be obtained and compensated for.

EQUATION 1

$$\begin{vmatrix} f0/f4 \\ f1/f5 \\ f2/f6 \\ f3/f7 \end{vmatrix} * \begin{vmatrix} +1+1+1+1 \\ +1-1-1+1 \\ +1-1+1-1 \\ +1+1-1-1 \\ -1-1-1-1 \\ -1+1+1-1 \\ -1+1-1+1 \\ -1-1+1+1 \end{vmatrix} = \begin{vmatrix} h0 \\ h1 \\ h2 \\ h3 \\ h4 \\ h5 \\ h6 \\ h7 \end{vmatrix}$$

The F0/F4 value, which must be either +1, 0 or −1 as it comes from comparison amplifier 80 and delay 90, is fed directly, in an non-inverted form, to one input each of summation amplifiers 110, 111, 112, and 113. The f1/f5 value, likewise either +1, 0 or −1, comes from comparison amplifier 81 and delay 91 directly to one input each of summation amplifiers 110 and 113 and, after inversion by inverter 101, to one input each of summation amplifiers 11 and 112. The f2/f6 value (+1, 0 −1), comes directly from comparison amplifier 82 and delay 92 to one input each of summation amplifiers 110 and 112 and, after inversion by inverter 102, to one input each of summation amplifiers 111 and 113. The f3/f7 value (+1, 0 or −1) comes directly from comparison amplifier 83 and delay 93 to one input each of summation amplifiers 110 and 111 and, after inversion by inverter 103, to one input each of summation amplifiers 112 and 113.

Each of the four summation amplifiers 110, 111, 112, and 113 provides its output, which is in the range −4, to +4, directly to one input of a respective differential amplifier 130, 132, 134 and 136, and respectively via inverters 120, 121, 122, and 123 to one input of a respective differential amplifier 131, 133, 135 and 137. The other input of each of the differential amplifiers 130 through 137 is supplied by a threshold value generator 140, which provides a threshold value which is optimally greater than +2 and less than +3, as explained below. The inputs, inverted and non-inverted, to the 8 differential amplifiers are indicated as H0 through H7. They form the values in the right-hand matrix of equation 1, above. Different combinations of frequencies f0/f4, f1/f5, f2/f6 and f3/f7 and encode different values 0 through 7, as was shown in Table 1.

For example, suppose the transmitted symbol has been 3, for which frequencies f0, f1, f2 and f3 are transmitted, and assuming proper reception, the received values at the output of differential amplifiers 80, 81, 82 and 83 are respectively $+1$, $+1$, $-1$ and $-1$. Referring again to Equation 1 with the received values filled in at the left, the equation becomes $$\begin{vmatrix} +1 \\ +1 \\ +1 \\ -1 \\ -1 \end{vmatrix} * \begin{vmatrix} +1+1+1+1 \\ +1-1-1+1 \\ +1-1+1-1 \\ +1+1-1-1 \\ -1-1-1-1 \\ -1+1+1-1 \\ -1+1-1+1 \\ -1-1+1+1 \end{vmatrix} = \begin{vmatrix} 0 \\ 0 \\ 0 \\ +4 \\ 0 \\ 0 \\ 0 \\ -4 \end{vmatrix} \quad \text{EQUATION 2}$$

Equation 2 assumes proper reception. If we assume that, in addition to the frequency values for symbol 3, an extra frequency value is received, for example, f4, is received during the interval appointed for reception of its opposite number, Equation below shows what happens. The signals for f0 and f4 meet at the differential input terminals of differential amplifier 80, providing a zero output from that amplifier, which appears at the top of the left-most matrix in equation 3.

$$\begin{vmatrix} 0 \\ +1 \\ -1 \\ -1 \end{vmatrix} * \begin{vmatrix} +1+1+1+1 \\ +1-1-1+1 \\ +1-1+1-1 \\ +1+1-1-1 \\ -1-1-1-1 \\ -1+1+1-1 \\ -1+1-1+1 \\ -1-1+1+1 \end{vmatrix} = \begin{vmatrix} -1 \\ -1 \\ -1 \\ +3 \\ +1 \\ +1 \\ +1 \\ -3 \end{vmatrix} \quad \text{EQUATION 3}$$

As can be easily seen, the plus three value in the right-most, or correlation matrix, is still the highest output value from the system, and can be easily distinguished as the proper output value. If, instead of an extraneous f4 value at the input of the receiver, the f0 value had been erroneously missing at the input, the output from differential amplifier 80 would still have been zero, and Equation 3 would still apply. As long as only one of the eight frequency values is erroneous at the input of the receiver, the system can accurately detect the correct response. If two of the eight values are in error, all outputs from the system are plus or minus two, clearly indicating erroneous reception, although not correcting it.

While the system has been shown in the form of a special purpose computer, this has been done partially for ease of illustration and explanation of the operation of the system. It would also be possible to implement most of the system as a programmed general-purpose digital computer. A Macintosh IIx computer is useful in this regard.

The individual frequency signals can be sent in series, as in FIG. 3A, in parallel as in FIG. 3B, or in a combination of series and parallel, as in FIG. 3C. When they are sent in series, as in 3A, a time interval is established between transmission of one of each successive group of two opposite frequencies by clock 39, and the same time interval is considered during reception by the delays imposed by time delays 90 through 93. When they are sent in parallel, as in FIG. 3B, where the drawing is intended to show four frequency pulses of different frequency in time coincidence, clock 39, if it exists, pulses all four oscillators at the same time, and delays 90 through 93, if they exist, are all set for the same value. The time intervals for the series/parallel combination shown in FIG. 3C is a combination of the two above.

Consider now the waveforms of FIGS. 4A through 4D. In FIG. 4A, two separate sequences, A and B, of four pulses each are sent in sequence, resulting in the ability to send and receive 64 different symbols with the eight pulses of the two sequences. Each sequence is a serial set of pulses such as has been described above. The beginnings of the two sequences are separated by a time difference or delay $\Delta t$. In the receiver, the correlation pulse $h_a$ of FIG. 4B is delayed by the time interval $\Delta t$ with respect to the correlation pulse $h_b$ of FIG. 4B so that when the coincident correlation are multipled together as shown in FIG. 4D, an increased correlation pulse $H_{ab}$ is obtained for the coincidence of the two correctly correlated pulses, shown as $H_{ab} = [h_a(t)][h_b(t+\Delta t)]$. This method enhances the sensitivity of the system while raising the number of possible recognition codes to 64. This feature results from the 4-pulse correlation/recognition function going to zero on all except the correct sequence. Since to multiply by zero produces a null result, in an ideal system, all multiplied outputs except the correct one are zero. In a noisy or contaminated signal, the correct multiplied signal should still be higher than the incorrect ones.

Figure 5:
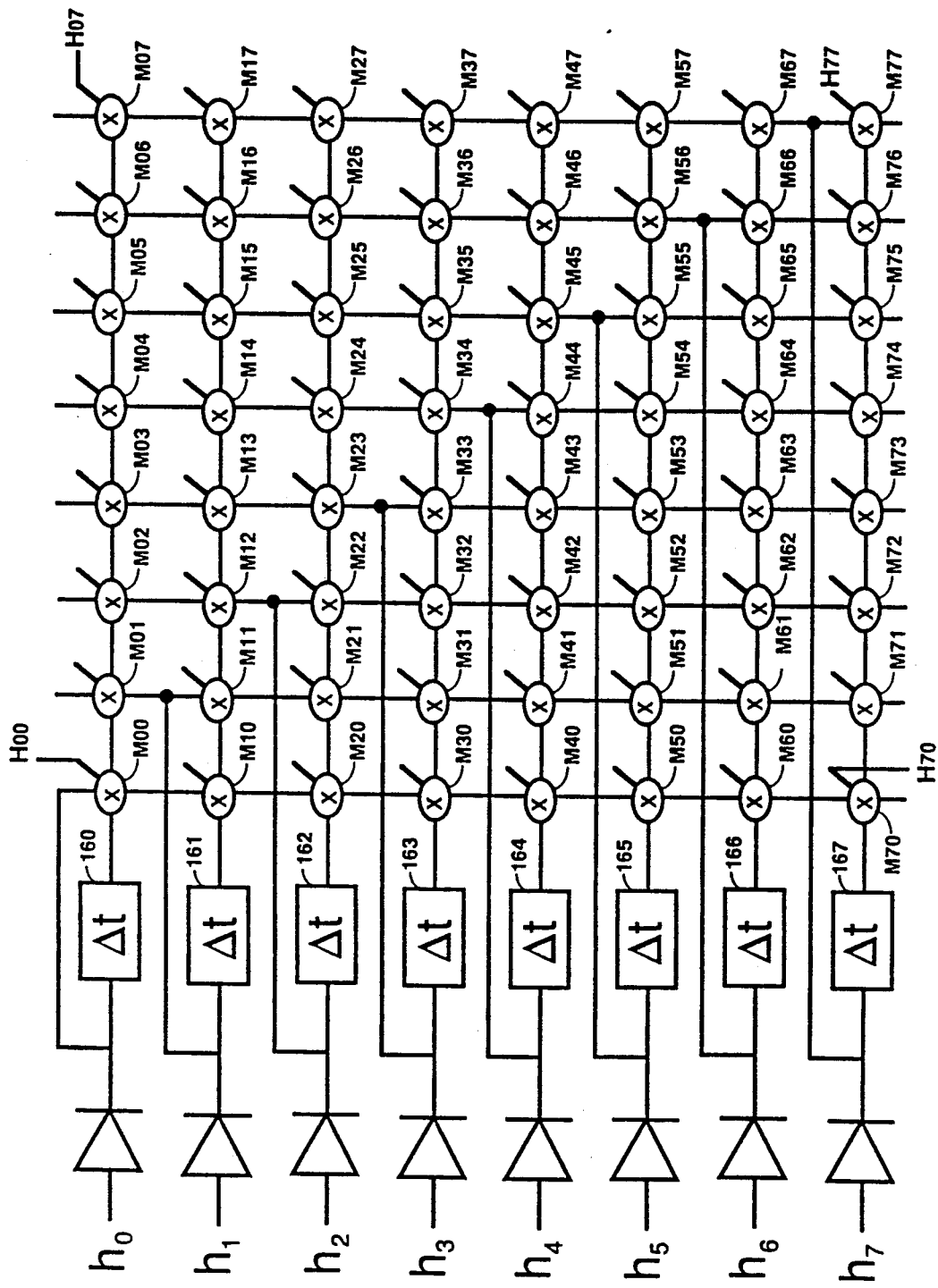
FIG. 5 shows how a 64 symbol recognition system might be implemented, using a signal such as that shown in FIG. 4A, obtaining two separate recognition steps for 8 symbols each, giving an 8×8 symbol output.

FIG. 5 is a schematic view of a special purpose receiver system for carrying out the recognition of 64 possible recognition codes. The $h_0$ through $h_7$ correlation pulse values at the inputs to the system of FIG. 5 could be obtained from the correspondingly marked lines in the system of FIG. 2. Eight non-delayed correlation pulses and eight correlation pulses delayed by time delays 160 through 167 are provided to the two inputs of multipliers $M_{00}$ through $M_{77}$ at an array of nodes, resulting in 64 multiplied outputs $H_{00}$ through $H_{77}$. These 64 output pulses are recognition pulses for the 64 possible symbols or recognition codes of the system. A threshold detector would probably be added to each node in a complete mechanization of the system. Similarly, a sequence of 12 pulses could provide 512 different codes $(8 \times 8 \times 8)$, and so on.

It may also be possible to achieve more than 64 codes by using different time orders for the pulses of various frequencies, or to increase the number of available codes by changing the time delays between the two four-pulse sequences.

Now that a working example of the invention has been disclosed, a broader overview of the invention is in order. The invention implements a Hopped Frequency Shift Keyed (HFSK) method of communication with an apparatus for carrying out the method. The name HFSK refers to frequency "hopping" which means that several different frequencies are sequentially involved in a transmission. The term Frequency Shift means that each frequency burst is one of two frequencies which is selected according to the HFSK plan of operation, which is described in the following paragraphs.

An HFSK signal is composed of pulses of eight possible frequencies, two groups of four, which are selected from a spectrum of frequencies which can correspond to available frequencies, or which can also correspond to a set of frequency bins from a Fast Fourier Transform (FFT). The HFSK system sends one of two frequencies in a burst, sending one piece of information (a bit). Then, rather than to wait for multipath signal receptions to decrease, as is presently done with spaced frequency shift key (SFSK) systems, HFSK hops to another frequency pair and sends another bit. This process is repeated until four bits are sent, which comprise a symbol. By this time, multipath signal receptions may have died down sufficiently to allow use of the first frequency pair again without fear of confusion. If desired, one may wait additional time, to allow multipath to die, or one may add uniqueness to the code being sent. In the preferred embodiment, using serial transmission of bits, there is a wait of one extra bit period between two symbols.

There are many possible variables, or degrees of freedom, of the HFSK system, that can be selected to optimize or customize performance, including frequency band, frequency separation, pulse length, time between symbols, and frequency hopping sequence. The selection of these variables will be governed, at least in part, by the type and degree of contamination of the communications medium.

To achieve basic symbol correlation, the spectrum is divided into two portions and, somewhat arbitrarily, the lower half is named "P" (positive) and the upper half "N" (negative). This is referred to as the "polarity" of the frequencies, and does not represent any actual positive or negative aspects at this point. However, these polarities carry over into the Hadamard matrix operations in which actual mathematical positive and negative polarities are essential for the proper operation of the system. An envelope detection is performed for filter outputs for frequencies in each half of the spectrum, and each N filter output is subtracted from its corresponding P filter output. The resulting set of signals can go positive, or negative, depending upon which frequency (P or N) is being received at any instant.

Since a symbol contains four bits (from four sequential bursts in the preferred embodiment) it is necessary to align the bits in time by delaying the first bit three bit intervals ($3\Delta t$), the second bit two bit intervals ($2\Delta t$), and the third bit one bit interval ($\Delta t$). This can be done by time delays 90 through 93 in FIG. 2. At the end of these delays the bits are time coincident and it remains simply to build matched filters for each expected symbol value. It happens that there exist eight symbol values that can be acceptably distinguished, as have already been described. For efficiency, these eight symbols can be recognized using only four summation nodes (as with amplifiers 110 through 113 in FIG. 2), because half of the eight are symmetric inverses of the others, which means that the recognition pulses are positive going for four and negative going for the other four.

At the heart of the HFSK system is a set of symbols called the Cross Correlation Cancelling Code Set, or C3 code set. The C3 code set is defined mathematically by Equation 4, which is a generalized form of the matrix equation of Equation 1. The stored recognition factors are the same as the central matrix in Equation 1.

$$h_A = \sum_0^3 p_b r_{(A,b)}$$ EQUATION 4

Where:
$h_A$ = Recognition function
$p_b$ = Value of signal at position b.
$r_{(A,b)}$ = Stored recognition factors
A = Cross correlation canceling code set A pulse at a given position contains one of two frequencies, represented as fn and fm. The signal at frequency fn, when filtered and detected in the receiver, yields a positive voltage and the signal at frequency fm yields a negative voltage. Referring to Table 1, n can be 0 to 3 and m can be 4 to 7. Any one set of four pulses can be represented as follows: f0/f4, f1/f5, f2/f6, and f3/f7. When the set of f0, f5, f2, f7 is considered, the normalized detected values are $+1, -1, +1, -1$. When these values are multiplied by the corresponding recognition factors $+1, -1, +1, -1$ for symbol 2 from Table 1, the set $+1, +1, +1, +1$ is obtained as the recognition result, giving a strong pulse at the signal test point for h2. However, when these values are multiplied by the recognition factors $+1, +1, -1, -1$ for symbol 3 from Table 1, the set $+1, -1, -1, +1$ is obtained as the recognition result, giving a zero signal at the signal test point for h3. There exist eight such sequences, as shown in Table 1, which can be recognized with high probability using the system described herein. For each such sequence, the other seven codes conveniently cancel. Table 2, following, shows the cross correlation between each of the eight transmitted codes and the stored recognition factors for each of the eight codes.

TABLE 2

| Xmit Code | C3 CODE SET CROSS CORRELATIONS Stored Recognition Factors | | | | | | | |
|---|---|---|---|---|---|---|---|---|
| | 0 | 1 | 2 | 3 | 4 | 5 | 6 | 7 |
| 0 | +4 | 0 | 0 | 0 | −4 | 0 | 0 | 0 |
| 1 | 0 | +4 | 0 | 0 | 0 | −4 | 0 | 0 |
| 2 | 0 | 0 | +4 | 0 | 0 | 0 | −4 | 0 |
| 3 | 0 | 0 | 0 | +4 | 0 | 0 | 0 | −4 |
| 4 | −4 | 0 | 0 | 0 | +4 | 0 | 0 | 0 |
| 5 | 0 | −4 | 0 | 0 | 0 | +4 | 0 | 0 |
| 6 | 0 | 0 | −4 | 0 | 0 | 0 | +4 | 0 |
| 7 | 0 | 0 | 0 | −4 | 0 | 0 | 0 | +4 |

To implement the C3 Code requires multiplying the Signal Value set, (the transmit code in Table 2) at each instant in time, by the Stored Recognition Factor set, and then adding the resulting values, to form a recognition level, as displayed in the middle of Table 2. The recognition level becomes a time varying function as sequential signal values are multiplied by the constant recognition set and added together. The benefit of the C3 code is derived from the fact that the correlations between the eight codes are either zero or opposite in polarity. For each code which has a correlation of +4, there is another code which has a correlation of −4. These two codes are called the conjugates of each other. When the conjugate codes are separated, using polarity as a criterion, it becomes practical to implement recognition of all eight codes using only four delay summation elements.

A benefit of the C3 Code Set is that it provides a set of eight symbols, using only four bits, with cross correlations that go to zero. Quasi-random codes, in common use, use 19 bits to achieve 12 symbols, with cross correlations that do not go to zero. It is important for the cross correlations to tend toward zero because one can then align the correlation peaks from two sequential symbols and then multiply them to achieve 64 different identification codes that have small cross correlations. Having 64 possible identification codes is impressive alone, but this multiplying of correlation functions also enhances signal-to-noise performance of the resulting signal detection, helping the system to perform under highly adverse conditions. The small number of bits (8) in each 64-code message, together with not having to wait for multipath to decay, also allows the signal to achieve relatively high message rates. For example, if each bit were 4 milliseconds long, it would be possible to send 25 such messages per second through the media, each one with a possibly different code selected from 64 possible codes.

Part of the ability of the HFSK system to reject interference stems from the relatively narrow bandwidth of the frequency separation filters (or FFT). However, the frequency shift associated with the Doppler effect, caused in audio signalling systems by relatively rapid movement between the transmitter and the receiver, can cause the frequency of the signals to move outside the filter bands. The HFSK system can detect the transmitted signal accurately even in the presence of a Doppler shift by doing multiple, identical symbol correlations, with matched filters, up and down the spectrum, and then combining the correlations. Since these computations are done at the receiving end and can be done at a high rate of speed compared to the transmission rate, or, if done on a special purpose computer, in parallel, the multiple correlations and associated computations will not necessarily slow the transmission rate. In setting up band pass filters or FFT bins to solve the Doppler problem, they should be spaced uniformly with no gaps between band edges, thereby preserving the same pattern as the signals move up and down in frequency due to Doppler shifts.

Although the frequency separation devices have been described as filters or FFT bins, there are actually at least four methods of converting the input waveform into frequency and amplitude vs. time information.

The system can use comb filters, which are narrow band analog filters used to separate frequencies, in combination with envelope detectors to yield analog amplitude information. This method can be implemented in either digital signal processing or analog hardware, but with analog hardware it is easier to achieve a wide dynamic range.

The system can use quadrature detectors, multiple local oscillator/synchronous demodulator pairs in 90 degree phase relationship to separate signals into frequency components. This is an analog technique, similar to the comb filter approach, but it has a slight advantage in noise rejection.

The system can use Fast Fourier Transform (FFT) techniques. This is a digital signal processing technique, requiring moderately high speed analog to digital (A/D) converters at the input. An adequate dynamic range depends upon having costly A/D converters (16 bits, or more).

The system can use wave period processing, which is a hybrid analog/digital technique that provides low cost, wide dynamic range, small size and power, traded against a small reduction in sensitivity and a reduced ability to recognize multiple simultaneous signals.

The correlation which follows the filter and detector stage can be done with time delays, polarity inversions, and arithmetic processes to achieve comparison with the expected codes, implemented either in digital signal processing or analog hardware. However, there are at least two other possible methods of achieving this correlation now under investigation.

Neural networks are a new technique under investigation. Very Large Scale Integrated (VLSI) chips are being developed which will offer possible advantages of compact size, high speed, and low power. Other possible advantages include improved immunity to cross-correlation and multipath problems. Implementation with this technique is not fully developed at this point. Another digital signal processing technique under investigation that may simplify implementation of the system uses fuzzy logic VLSI chips.

I claim:

1. A system for transmitting and receiving signals through a contaminated transmission path from a first location to a remote location which is remote from said first location, comprising:
    signal generator means capable of generating eight distinct single frequency signals in eight distinct frequency bands,
    symbol encoding means using a predetermined four of the eight single frequency signals to represent unit positive numbers and the remaining four of the single frequency signals to represent unit negative numbers while encoding each of eight distinct symbols to form a symbol signal consisting of a combination of said signal frequency signals representing unit numbers which correspond to an orthogonal Hadamard matrix,
    signal transmitter means at said first location for transmitting said symbol signal into the transmission path,
    signal receiver means at said remote location for receiving a possibly distorted version of the symbol signal as transmitted through the contaminated transmission path,
    frequency separation means for determining which bands of the eight distinct frequency bands are represented in the received signal above a threshold amplitude and for providing unit positive or negative output signals respectively corresponding to the unit positive or negative values assigned for each single frequency signal by the signal generator means,
    correlation means for correlating said positive or negative output signals with at least half of the unit numbers in said orthogonal Hadamard matrix to derive eight correlation values relating to correlation between the received signal and the eight distinct symbols which the received signal possible represents, and
    means for comparing the eight correlation values with a threshold value to determine which of the eight distinct symbols has most probably been transmitted.

2. A system for transmitting and receiving signals through a contaminated transmission path, comprising:
    encoding means for encoding a message chosen from a plurality of possible symbols in an even plurality of possible signals, the possible signals being individual single frequency signals in accordance with an orthogonal Hadamard matrix,
    transmitting means for transmitting the encoded message through the contaminated transmission path,
    receiving means for receiving a signal carrying a possibly contaminated version of the encoded message from the transmission path, and
    decoding means for decoding the received signal by a correlation of said single frequency signals in the received signal with reference values in the orthogonal Hadamard matrix.

3. A method for transmitting and receiving signals through a contaminated transmission path, comprising:
    encoding a message chosen from a plurality of possible symbols in an even plurality of possible signals, the possible signals being individual single frequency signals in accordance with an orthogonal Hadamard matrix, transmitting the encoded message through the contaminated transmission path, receiving a signal carrying a possible contaminated version of the encoded message from the transmission path, and decoding the receiving signal by a correlation of said single frequency signals in the received signal with reference values in the orthogonal Hadamard matrix.

4. A method for transmitting and receiving signals through a contaminated transmission path from a first location to a remote location which is remote from said first location, comprising:

generating eight distinct signal frequency signals in eight distinct frequency bands, using a predetermined four of said eight single frequency signals to represent unit positive number and the remaining four of the single frequency signals to represent unit negative numbers while encoding each of eight distinct symbols to form a symbol signal consisting of a combination of said single frequency signals representing unit numbers which correspond to an orthogonal Hadamard matrix, transmitting said symbol signal into the transmission path at the first location, receiving a possibly distorted version of the symbol signal at said remote location as transmitted through the contaminated transmission path, determining which bands of the eight distinct frequency bands are represented in the received signal above a threshold amplitude and providing unit positive or negative output signals respectively corresponding to the unit positive and negative values assigned for each single frequency signal while encoding, correlating said positive or negative output signals with at least half of the unit numbers in said orthogonal Hadamard matrix to derive eight correlation values relating to correlation between the received signal and the eight distinct symbols which the received signal possibly represents, and comparing the eight correlation values with a threshold value to determine which of the eight distinct symbols has most probably been transmitted.

* * * * *